US012766792B2

(12) United States Patent
Vatani et al.

(10) Patent No.: US 12,766,792 B2
(45) Date of Patent: Oct. 20, 2026

(54) PRINTING METHOD FOR ADDITIVE MANUFACTURING, INCLUDING IN-SITU POWDER REGENERATION BY REMOVING PORTIONS OF DEPOSITED POWDER

(71) Applicant: Sakuu Corporation, San Jose, CA (US)

(72) Inventors: Morteza Vatani, Los Gatos, CA (US); Seyed Mohammad Sajadi, San Jose, CA (US); Steven Zhichao Shi, Santa Clara, CA (US); David Paul Wanamaker, San Jose, CA (US); Siamak Azizi, Los Gatos, CA (US); Karl Littau, Los Altos Hills, CA (US)

(73) Assignee: Sakuu Corporation, San Jose, CA (US)

( * ) Notice: Subject to any disclaimer, the term of this patent is extended or adjusted under 35 U.S.C. 154(b) by 150 days.

(21) Appl. No.: 18/909,134

(22) Filed: Oct. 8, 2024

(65) Prior Publication Data

US 2026/0097561 A1 Apr. 9, 2026

Related U.S. Application Data

(63) Continuation of application No. 18/154,775, filed on Jan. 13, 2023, now Pat. No. 12,240,177.

(51) Int. Cl.

| | |
|---|---|
| ***B29C 64/357*** | (2017.01) |
| ***B22F 10/14*** | (2021.01) |
| ***B22F 10/73*** | (2021.01) |
| ***B28B 1/00*** | (2006.01) |
| ***B28B 17/02*** | (2006.01) |
| ***B29C 64/165*** | (2017.01) |
| ***B29C 64/188*** | (2017.01) |

(Continued)

(52) U.S. Cl.

CPC ............ *B29C 64/357* (2017.08); *B22F 10/14* (2021.01); *B22F 10/73* (2021.01); *B28B 1/001* (2013.01); *B28B 17/02* (2013.01); *B29C 64/165* (2017.08); *B29C 64/188* (2017.08); *B29C 64/255* (2017.08); *B29C 64/30* (2017.08); *B29C 64/314* (2017.08); *B29C 64/393* (2017.08); *B33Y 10/00* (2014.12); *B33Y 30/00* (2014.12); *B33Y 40/20* (2020.01); *B33Y 50/02* (2014.12)

(58) Field of Classification Search

CPC ... B29C 64/357; B29C 64/314; B29C 64/188; B29C 64/255; B29C 64/393; B29C 64/30; B29C 64/165; B33Y 10/00; B33Y 30/00; B33Y 50/02; B33Y 40/20; B22F 10/14; B22F 10/73; B28B 1/001; B28B 17/02

See application file for complete search history.

(56) References Cited

U.S. PATENT DOCUMENTS

| | | | | |
|---|---|---|---|---|
| 2014/0257549 | A1* | 9/2014 | Swartz | B33Y 50/02 700/119 |
| 2020/0247045 | A1* | 8/2020 | Giacobbi | B32B 5/26 |
| 2023/0118044 | A1* | 4/2023 | Weedlun | G03G 15/161 428/32.78 |

* cited by examiner

*Primary Examiner* — Yunju Kim
(74) *Attorney, Agent, or Firm* — Arman Khosraviani

(57) ABSTRACT

A method and system for 3D printing for creating at least two discrete sections of powder on a substrate, segmenting the substrate to isolate the at least two discrete sections of powder, compacting the powder on a segment of the substrate, removing loose/non-compacted powder from the segment of the substrate, create a printed/processed layer by performing one or more of a printing process or a processing operation on the segment of substrate, and transferring the printed/processed layers from the segment of substrate to a build platform.

10 Claims, 10 Drawing Sheets

(51) Int. Cl.

| | |
|---|---|
| ***B29C 64/255*** | (2017.01) |
| ***B29C 64/30*** | (2017.01) |
| ***B29C 64/314*** | (2017.01) |
| ***B29C 64/393*** | (2017.01) |
| ***B33Y 10/00*** | (2015.01) |
| ***B33Y 30/00*** | (2015.01) |
| ***B33Y 40/20*** | (2020.01) |
| ***B33Y 50/02*** | (2015.01) |

PRINTING METHOD FOR ADDITIVE MANUFACTURING, INCLUDING IN-SITU POWDER REGENERATION BY REMOVING PORTIONS OF DEPOSITED POWDER

TECHNICAL FIELD AND BACKGROUND

The present disclosure pertains to an improved printing method and system for additive manufacturing (AM) process, including carrying out part of the process on a continuous substrate, and part of the process using segments of the substrate mounted on carrier frames. The present disclosure also pertains to an in-situ material regeneration method and system that enables recovery, reconditioning and reuse of used materials, such as powders and/or liquids collected from the AM process, thus increasing materials utilization efficiency and reducing manufacturing costs.

In typical AM operations, the layers are built on top of each other, or they are built on a conveyor belt, and at the last stage, they are stacked on each other. For example, in current binder jetting 3D printing, a powder layer of build material is deposited on a powder bed or a substrate followed by jetting a liquid binder onto the deposited powder layer to define the printed pattern. In this process, large amounts of excess, unbound build material powders are typically collected. The build material powder may be expensive, and, therefore, the collected used powder should preferably not be discarded as waste. Similarly, in an inkjet 3D printing or a jetted material 3D printing process, large amounts of used liquids such as solvents and inks may be collected and they cannot be discarded as wastes. However, regeneration of the used powder and/or liquids through external resources can increase both time and costs for manufacturing. Therefore, there is a need to provide an effective in-situ material regeneration system for collecting, reconditioning and reusing of the used powders and liquids. Also, there is a need to provide improved transport of layers of the powder through various stations individually, and to facilitate the removal of the layers of processed powder, after processing at the various stations, from a substrate they are mounted on to provide for improved stacking of the layers to build a multi-layer stack product.

SUMMARY OF THE INVENTION

In an implementation, a method including depositing powder on a substrate at a powder deposition station, removing first portions of the powder to create clean portions of the substrate between portions of deposited powder, moving the portions of deposited powder remaining on the substrate to a wetting station and wetting the powder with a wetting agent at the wetting station, passing the wetted portions of deposited powder through a compacting station to compact the powder, cutting the substrate at the clean portions to create substrate segments each respectively including one of the portions of the deposited powder, transferring the substrate segments having deposited powder mounted thereon to respective carrier frames, transferring the substrate segments having deposited powder mounted thereon to respective carrier frames, moving the substrate segments to a binder jetting station and depositing a binder to the powder at the binder jetting station, and moving the carrier frames, with the substrate segments having the layers mounted thereon, to a stacking station, to stack the layers individually on one another to form a multilayer product.

In another implementation, a method for 3D printing, the method including creating at least two discrete sections of powder on a substrate, segmenting the substrate to isolate the at least two discrete sections of powder, compacting powder on a segment of the substrate, removing loose/non-compacted powder from the segment of the substrate, creating a printed/processed layer by performing one or more of a printing process or a processing operation on the segment of substrate, and transferring the printed/processed layers from the segment of substrate to a build platform.

In another implementation, a 3D printing system, the system including a powder deposition station configured to deposit powder on a continuous substrate, a powder removal station configured to create at least two adjacent discrete sections of powder on the continuous substrate, separated by a powder-free clean strip of the continuous substrate, a cutting station configured to cut the continuous substrate at the clean strip of the continuous substrate to segment the continuous substrate into individual substrate segments to isolate the at least two discrete sections of powder respectively formed on adjacent ones of the individual substrate segments, a transfer station configured to transfer the individual substrate segments respectively onto corresponding individual carrier frames, an inverting station configured to invert the carrier frames so that the two discrete sections of powder are suspended from the respective individual substrate segments that they are deposited on, and a stacking station configured to receive and stack discrete sections of the powder from respective carrier frames.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

This disclosure provides an improved AM system, for example a 3D printing system, in which early portions of a 3D printing process is carried out on a continuous substrate, after which the substrate is cut into segments, each including a layer, formed of portions of printed powder, mounted thereon, the segments are each mounted on individual carrier frames, and the layers are subject to further processing while mounted on the carrier frames. Following this, the individual layers are transferred from the individual carrier frames to a stack of previously processed layers, on for example a build platform.

Figure 1A:
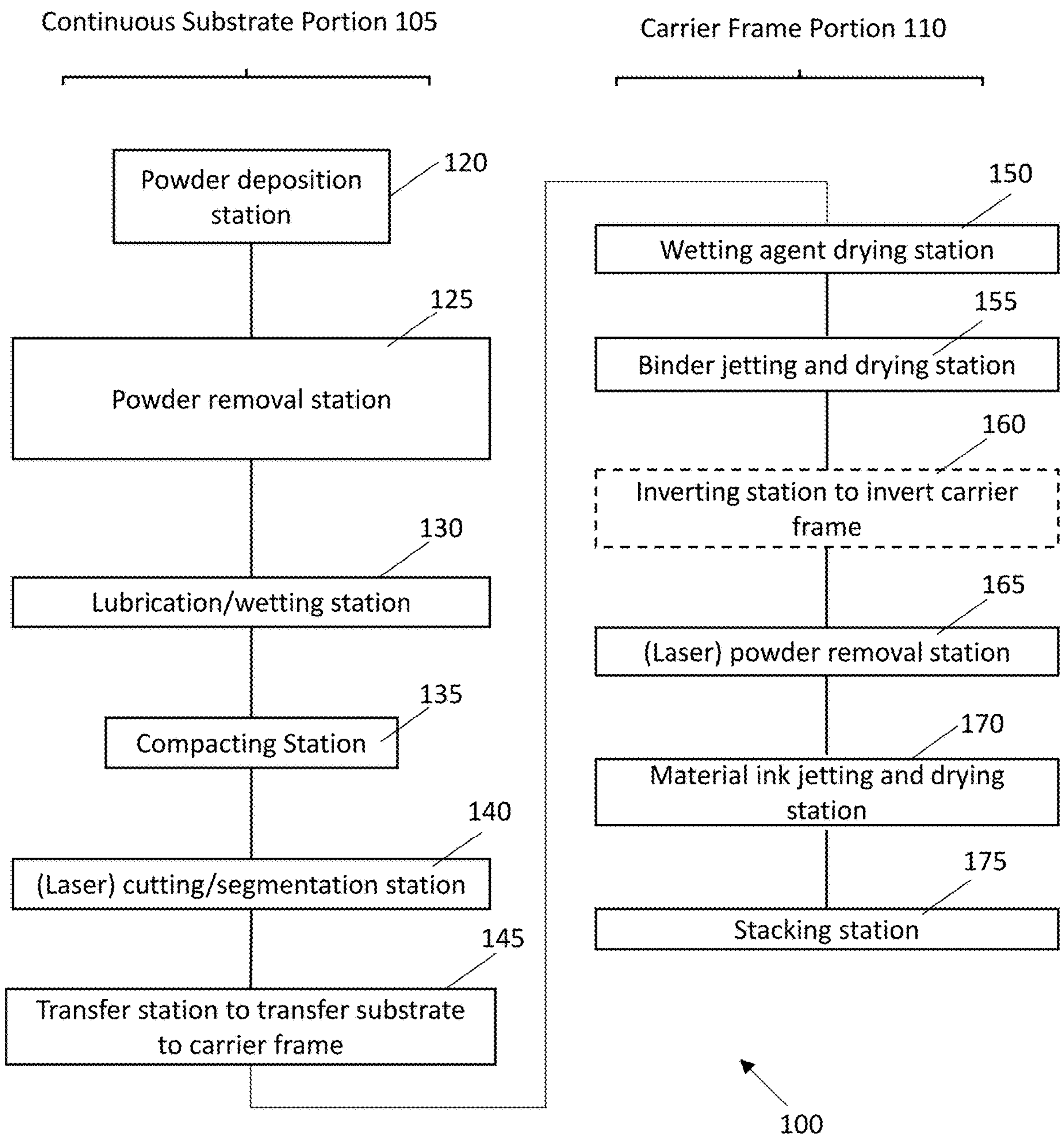
FIG. 1*a* shows an overall printing system for performing a portion of a printing process on a continuous substrate and a portion of the process carried out with substrate segments supported on carrier frames, in accordance with aspects of the present disclosure.

Referring to FIG. 1*a*, an overall system 100 is shown for performing early portions of a 3D printing process 105 on a continuous substrate, and later portions 110 of the process with individual layers mounted on carrier frames. As can be seen in FIG. 1*a*, the continuous substrate portion 105 of the system 100 includes a powder deposition station 120, where powder is deposited on a moving substrate, and a powder removal station 125, where powder is removed to create clean strips of the substrate separating adjacent sections of the powder which will become, in later stages of the process, layers of powder for stacking. The clean strips of the substrate will be used, at later stages of the process, for cutting the substrate into segments, each with a portion of the powder that will be formed into a powder layer for stacking. The continuous substrate portion of the system can also include a lubrication/wetting station 130, which wets the deposited powder with a wetting agent to prevent the powder from sticking to calendering rollers in a calendering or compacting station 135 which are used in the process to compact the wetted powder before further processing. This allows for achieving high packing density (e.g. greater than 30%) which otherwise cannot be achieved with typical AM systems. The continuous substrate can be formed of Mylar, for example, although other materials could be used.

Still referring to FIG. 1*a*, the next station in the system can be a (laser) cutting/segmentation station 140 which cuts the substrate into segments for further processing individually as layers on the segments, rather than processing of adjacent portions of powder on a continuous substrate. Although FIG. 1*a* shows that the cutting station 140 uses laser cutting, other cutting techniques could be used, if desired.

Still referring to FIG. 1*a*, later stages 110 of the 3D printing process are performed following transferring the individual substrate segments to corresponding individual carrier frames at a transfer station 145. Appropriate carrier frames for this purpose are described in a related application by the Applicant (U.S. application Ser. No. 18/074,298), entitled “Carrier Plate and Method of Use Thereof,” filed on Dec. 2, 2022, and which is hereby incorporated by reference. After segmenting, the wetting agent applied at the lubrication/wetting station, can be removed in a wetting agent drying station 150. Next, the sections of the layers on the substrate segments can be passed to a binder jetting and drying station 155 at which binder is applied to the individual layers of the powder on the substrate segments, followed by drying the binder at the same station. Alternatively, the binder jetting can take place at one station, and the drying of the binder can be performed at another station further down the processing line.

In the implementation shown in FIG. 1*a*, before further processing, the carrier frame is inverted in an inverting station 160 which turns the carrier frame 180 degrees so that the layer(s) of powder mounted on the carrier frames are suspended upside down from the corresponding substrate segment mounted on the carrier frame. In this manner, looser/non-compacted powder is influenced away from the substrate. In the implementation shown in FIG. 1*a*, after inversion of the carrier frame at the inverting station, excess powder or non-patterned portions of powder (i.e., powder which has not been subject to the binder jetting) can also be removed at a (laser) powder removal station 165. A related application by the Applicant (U.S. application Ser. No. 18/152,854), entitled “Method and Apparatus for Powder Removal in an Additive Manufacturing System,” filed on Jan. 11, 2023, and which is hereby incorporated by reference, describes features of a laser powder removal station for this purpose. In other implementations, inversion of the carrier frame may not be required, or alternative methods to remove the non-patterned portions of powder may be utilized.

Finally, after removal of the excess powder, the carrier plates, with substrate segments having individual layers of compacted and patterned powder thereon, are passed to other processing stations, such as for example, a material (ink) jetting and drying station 170. In some implementations, the carrier frame may be inverted by 180 degrees so that the layer of powder that is being processed is facing up. In alternative implementations, the steps of ink jetting and drying can be performed in two separate stations. In still other implementations, the carrier plates, with substrate segments can be passed to other processing stations which are not printing stations. For example, a processing station may pick and place an element such as a conductive element into the individual layer. Finally, the inverted carrier plates are passed to a stacking station 175 where the individual layers of powder, which have been fully processed, are removed to be placed on a stack of previously processed layers of powder to form a final product, on for example, a build platform. A suitable procedure for removing the individual layers from their respective carrier plates is described in the above-noted related application by the Applicant (U.S. application Ser. No. 18/074,298) and in another related provisional application by the Applicant (U.S. Provisional Application No. 63/299,863), entitled “Method and Apparatus to Process and Bond Layers in an Additive Manufacturing System,” filed on Jan. 14, 2022, and which is hereby incorporated by reference.

Although FIG. 1*a* shows an implementation of a system for performing a 3D printing process partially using a continuous substrate and partially using segments of the substrate mounted on carrier frames, the specific steps performed using the continuous substrate and the steps performed using the substrate segments mounted on carrier frames can be changed. For example, in an alternative implementation, the substrate segments, with their respective layers of powder, can undergo operations at the wetting agent drying station and the binder jetting and drying station before proceeding to be mounted on the carrier frames. Alternatively, the cutting and segmentation station can be located at a later point in the overall system. Additionally, any number of processing steps can be performed on any of the substrate segments, in any order.

Figure 1B:
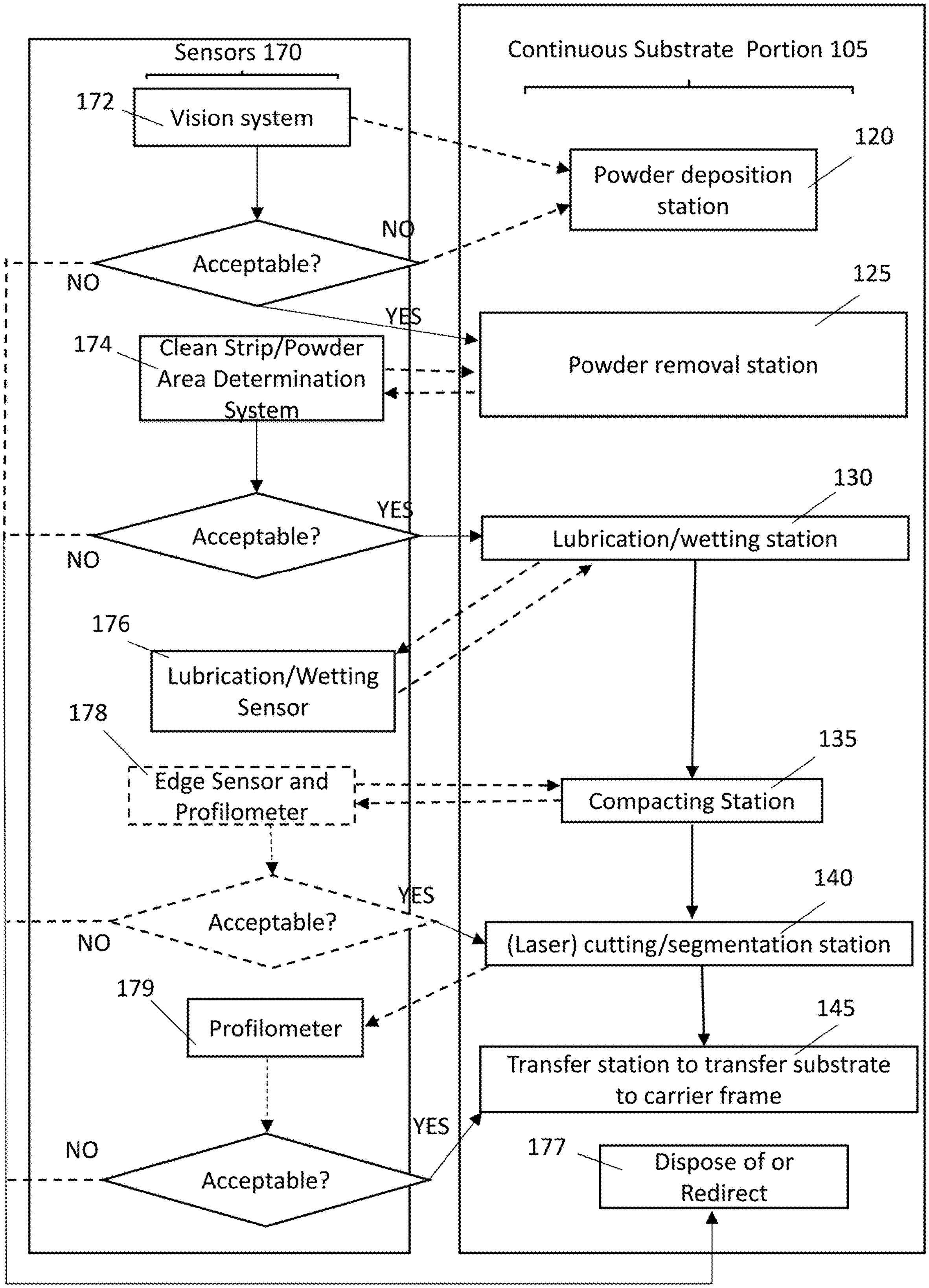
FIGS. 1*b* and 1*c* illustrate how one or more sensing/monitoring modules are utilized to control operation of the printing process of FIG. 1*a*.

FIG. 1*b* illustrates an aspect and embodiment in which one or more sensing/monitoring modules 170 are utilized to control operation of the continuous substrate portion 105 providing for a continuous production system and higher throughput. Utilization of the one or more sensing/monitoring modules 170 enables data to be used to update, enhance or refine the process, thereby potentially increasing the efficiency of each stage of the process, enhancing automation of the system and requiring fewer operators to oversee the entire process. In some embodiments, a subset of the sensing/monitoring modules 170 may be utilized, based on, for example, at which stage of the process most variation is experienced. The sensing/monitoring modules 170 may comprise, for example, one or more image acquisition devices, profilometers, edge sensors, lubrication/wetting sensors, or other sensing/monitoring devices. In addition to the sensors described above, other sensors now known or later developed may also be incorporated into the continuous production system. A computer system (not shown) may analyze the data from the various sensing/monitoring modules 170, determine if the data acquired falls within acceptable limits or below or above predetermined thresholds, and may adjust one or more operating parameters of the automated system based on the analysis. In some embodiments, the computer system may orchestrate operation of the system based on a configuration of rules, policies or other logic which may be incorporated into the system, or may be input by the user though a user interface.

The right side of FIG. 1*b* shows a flowchart of steps for an AM manufacturing process which occur on a continuous substrate, corresponding to operations described above for the continuous substrate portion 105 of FIG. 1*a*. On the left side of FIG. 1*b*, a flow chart is shown for data acquisition through various sensors 170 during various stages of the manufacturing process, the data acquisition occurring in conjunction with the AM manufacturing process shown in the right side of FIG. 1*b*. Dashed arrow lines show points in the AM manufacturing process where data is acquired and/or instructions transmitted, in accordance with aspects of the present disclosure.

In one aspect of the disclosure, a monitoring system, for example a vision system 172 associated with the powder deposition system 120 may determine one or more parameters of a thickness of the dispensed powder level, a surface profile or a topography, at one or more locations in real-time. Should it be determined by the computer system that the value of the one or more parameters is outside a predetermined range, or above/below a predetermined threshold value, the powder deposition station/apparatus 120 may be adjusted accordingly. An example of a monitoring system, for example a vision system 172 that can be utilized for this purpose is described in co-pending application Ser. No. 17/842,701, entitled "Three-Dimensional ("3D") Printing Apparatus with Counter-Rotating Roller", which is hereby incorporated by reference. In one embodiment, analysis of the vision system data by the computer system may determine defects in the deposited powder, or determine that one or more powder dispensers is not operating in an acceptable fashion. In this situation, the computer system may convey that information to the user by means of an interface/display, and/or may modify operation of the functioning dispensers to compensate for the inadequacy. In another embodiment, should it be determined by the computer system that the deposited powder cannot be utilized for further processing, the powder removal station 125 may be instructed to remove the entire deposited powder from the substrate. On the other hand, should it be determined by the computer system that there are substantially no defects, or that the value of the one or more parameters is within an acceptable range, or of an acceptable value, the powder removal station 125 may be instructed to create isolated regions of powder, or sections of powder separated by clean strips (areas from which powder has been removed) to be utilized for further processing.

In another aspect of the disclosure, a monitoring/sensing system, for example a clean strip/powder area determination system 174, which may also be a vision system, may determine if the powder removal operation by the powder removal station 125 between adjacent sections of powder is sufficient. Sufficiency may be determined in numerous ways by the clean strip/powder area determination system 174, for example, if it is possible to determine the edges of two adjacent powder sections sufficiently to enable a cutting operation to segment the two adjacent powder sections, if the area of powder remaining on the clean strip, that is the "cleaned" section of the substrate, is below a predetermined threshold amount, or if a minimum area of "cleaned" substrate is identifiable between two adjacent powder sections. In some embodiments, in addition to determining if the powder removal operation between adjacent sections of powder is sufficient, data from the same or a different vision system may be utilized to determine if the two adjacent sections of powder that have been created are in an acceptable form (for example, have not been damaged by the powder removal process) allowing for proceeding with next process steps, with no defects or errors, or with defects or errors that are within an acceptable range.

In a further aspect of the disclosure, a monitoring/sensing system comprising lubrication/wetting sensors 176 may permit controlling wetting of a deposited powder layer by the lubrication/wetting station 130. These sensors 176 enable automated in-line monitors to detect quality issues related to wetting, drying and deposition/removal of wetting agents such as steam in real time, thus minimizing production of defective parts. In particular, in accordance with implementations of the present disclosure, sensors 176 are provided which, along with intelligent software, can provide instant feedback to process control when a wetting quality issue is detected (e.g., excessive wetting or insufficient wetting, both of which will adversely affect the results of the subsequent compaction operation), thus minimizing production of defective parts. An example of a monitoring system that can be utilized for this purpose is described in co-pending application Ser. No. 18/074,341, "Wetness Sensor, Method and System for Sensing an Amount of a Wetting Agent," filed Dec. 2, 2022, which is hereby incorporated by reference.

Having passed through the lubrication/wetting station 130, the sections of lubricated deposited powder pass through a compacting station 135, which may comprise calendering rollers, where the powder is compacted. The substrate is then cut to isolate each section of powder into discrete segments of substrate in a (laser) cutting/segmentation station 140. In one embodiment, the substrate is segmented to isolate at least two discrete sections of powder. In one configuration, a monitoring/sensing system comprising an edge sensor 178 may be utilized to determine a location of an edge of a powder section as it leaves the calendering rollers, or locations of two adjacent edges of powder as they leave the calendering rollers. With this information, combined with the speed at which the substrate is traveling through the stations, the computer system can be used to determine the location at which a laser is to be directed, substantially in the middle of the "clean strip" between the two edges of powder which form the boundaries of two adjacent powder sections. In order to obtain a substantially straight line across the surface of the substrate, and substantially orthogonal to the edges of the substrate, in one implementation, based on the speed to the moving substrate, the angle of the laser can be adjusted, such that, as it traverses the substrate from one side to the other, while the substrate is moving, the laser or other cutting device in the (laser) cutting/segmentation station 140 cuts the substrate substantially in the middle of the two adjacent edges of powder. In another configuration, data indicative of the speed at which the substrate is moving, combined with geometrical information associated with the sections of powder and/or the "clean strip", may be utilized to determine where the substrate should be cut, and the computer system utilized to direct a cutting mechanism, such as a laser, to cut the substrate accordingly.

In one embodiment, prior to cutting, the sensor 178 may include a profilometer that may be used to determine the surface profile of the deposited powder, in some instances quantifying its roughness or flatness, and/or determining if the quality of the surface is acceptable to continue processing. In some configurations, if the surface roughness is above a predetermined threshold or outside of an acceptable range, the computer system may instruct the substrate to be moved in a direction such that it interacts with the compaction station 135 for further compaction. In other configurations, if the surface roughness is above a predetermined threshold or outside of an acceptable range, the computer system may instruct that section of substrate to be disposed of, and not undergo any further processing. In some embodiments, disposal may comprise separating the compacted powder from the substrate and recovering, reconditioning (or regenerating) the powder for reuse.

A profilometer 179 may also be utilized once the powder sections have been cut by the cutting/segmentation station 140, to check the quality of the powder prior to transferring the powder sections to a carrier frame. As also shown in FIG. 1*b*, if the outcome of any of the outputs of the various sensors 172, 174, 176, 178 and 179 is not acceptable, the operation can be directed to dispose of or redirect the powder (step 177). In some embodiments, disposal may comprise recovering, reconditioning (or regenerating) the powder for reuse.

Figure 1C:
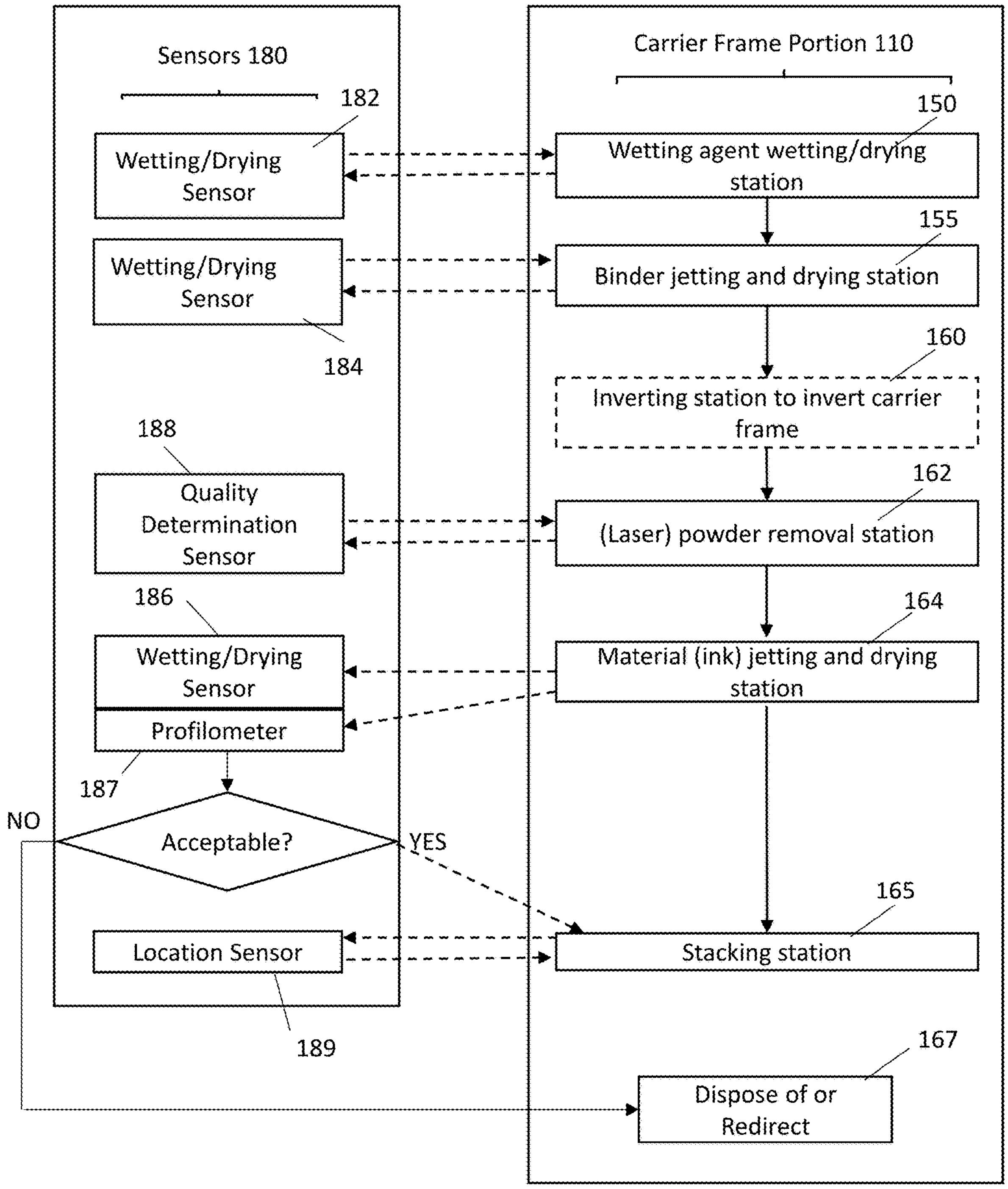

FIG. 1*c* illustrates an aspect and embodiment in which one or more sensing/monitoring modules 180 are utilized to control operation of the carrier frame portion 110 providing for a continuous production system and higher throughput. Similar to FIG. 1*b*, utilization of the one or more sensing/monitoring modules 180 in FIG. 1*c* enables data to be used to update, enhance or refine the process, thereby potentially increasing the efficiency of each stage of the process, enhancing automation of the productions system and allowing fewer operators to oversee the entire process. In some embodiments, a subset of the sensing/monitoring modules may be utilized, based on, for example, at which stage of the process most variation is experienced. A computer system (not shown) may analyze the data from the sensing/monitoring modules, determine if the data acquired falls within acceptable limits or below or above predetermined thresholds, and may adjust one or more operating parameters of the automated system based on the analysis. In some embodiments, the computer system may orchestrate operation of the system based on a configuration of rules, policies or other logic which may be incorporated into the system, or may be input by the user through a user interface. The right side of FIG. 1*c* shows a flowchart of steps for an AM manufacturing process performed on the carrier frame, corresponding to the steps shown in FIG. 1*a*. On the left side of FIG. 1*c*, a flow chart is shown for data acquisition through various sensors 180 during various stages of the manufacturing process, the data acquisition occurring in conjunction with the AM manufacturing process shown in the right side of FIG. 1*c*. Dashed arrow lines show points in the AM manufacturing process where data is acquired and/or instructions transmitted, in accordance with aspects of the present disclosure.

Monitoring/sensing systems comprising wetting/drying sensors 182, 184 and 186 may permit controlling lubrication/wetting of a deposited powder layer by the lubrication/wetting and/or drying station 150, binder jetting and drying station 155, and material jetting station and drying station 164. These sensors 182, 184 and 186 enable automated in-line monitors to detect quality issues related to wetting, drying and deposition/removal of lubrication/wetting agents such as steam, binder, material ink etc, in real time, thus minimizing production of defective parts. In particular, in accordance with implementations of the present disclosure, sensors are provided which, along with intelligent software, can provide instant feedback to process control when a wetting quality issue is detected (e.g., excessive wetting or insufficient wetting, both of which will adversely affect the results of the subsequent compaction operation), thus minimizing production of defective parts. An example of a monitoring system that can be utilized for the this purposed is described in the above-noted co-pending application Ser. No. 18/074,341, "Wetness Sensor, Method and System for Sensing an Amount of a Wetting Agent," filed Dec. 2, 2022, which is hereby incorporated by reference.

In some embodiments, quality determination sensors 188, such as imaging devices, may be incorporated to determine if all unbound powder deposited on the substrate has been removed after the carrier frame has been inverted (step 160) and the laser (or other cutting device) has been operated (station 162). This may be determined by utilizing the computer system to compare the pattern in the image to the pattern expected at this particular stage of the process. In some embodiments, the expected pattern may be stored in a memory element of the computer system. After such a comparison, should it be determined that some unbound powder still remain, the computer system may instruct the carrier frame to be inverted again until the remaining unbound power is removed, redirect the laser (or other powder removal device) in powder removal station 162 to perform additional powder removal based on the image data, or may instruct one or more additional powder removal device(s), for example an air knife, to operate and remove the remaining unbound powder based the quantity and location of the remaining powder. An example of a powder removal system that can be utilized for the this purposed is described in co-pending application Ser. No. 18/152,854, filed on Jan. 11, 2023, entitled "Method and Apparatus for Powder Removal in an Additive Manufacturing System," which is hereby incorporated by reference. A profilometer 187 may also be used to monitor the material (ink) jetting and drying station 164 in this regard.

The quality determination sensor 188, such as an imaging device, in conjunction with the computer system may also confirm the pattern created by binder deposition, ensuring that the pattern is that which is expected, and not an incorrect pattern. Based on the outcome being acceptable or not, as shown in FIG. 1*c*, the carrier frame may proceed to the next stage of processing, be stacked at the stacking station 165, redirected, or disposed of accordingly, as shown by module 167. The stacking station 165 may also be monitored by a location sensor 189 to ensure that the layers are properly aligned.

Figure 2:
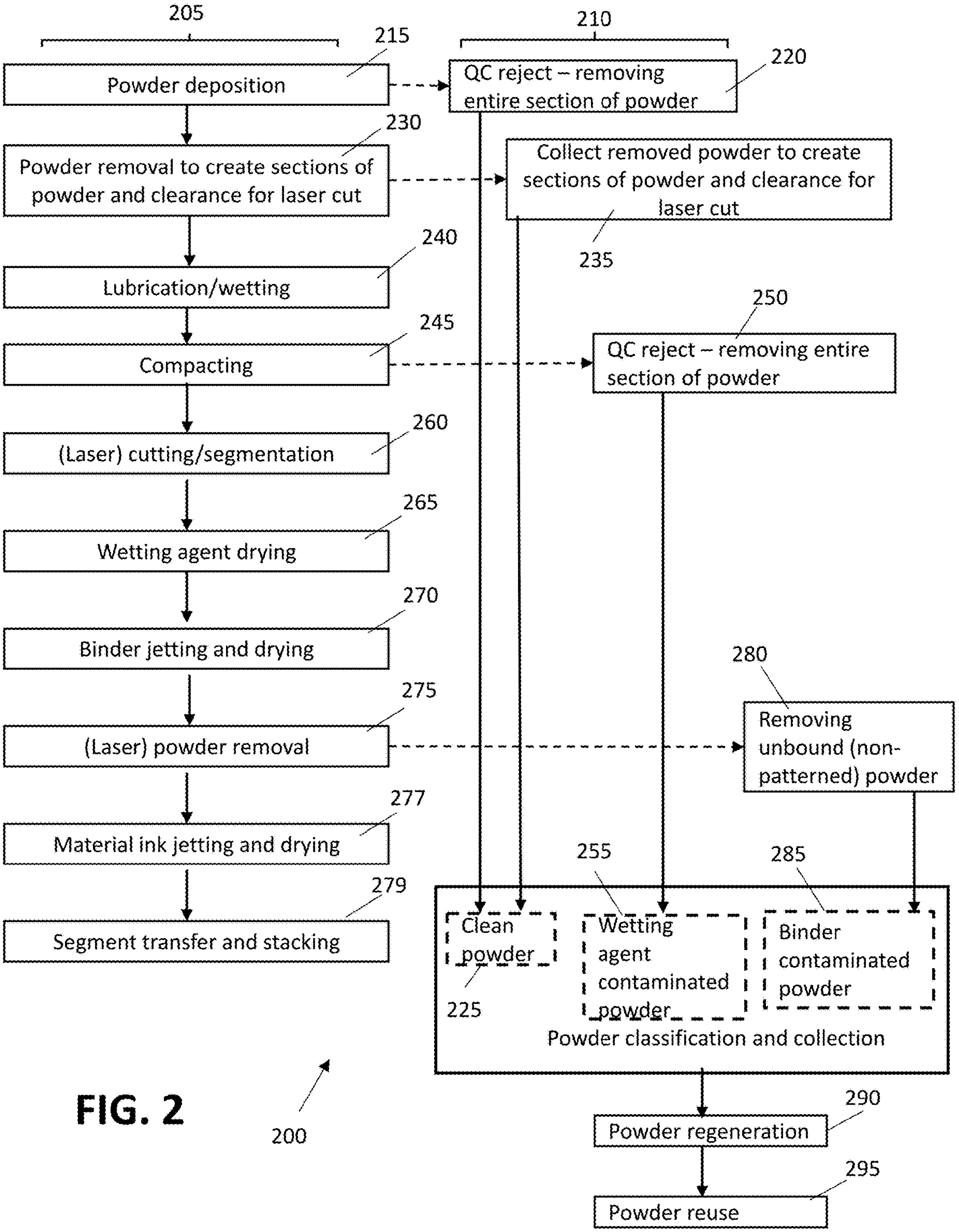
FIG. 2 shows an overall flow chart of a printing process using powder deposited on a substrate, including in-situ powder collection and regeneration, in accordance with aspects of the present disclosure.
Figure 4:
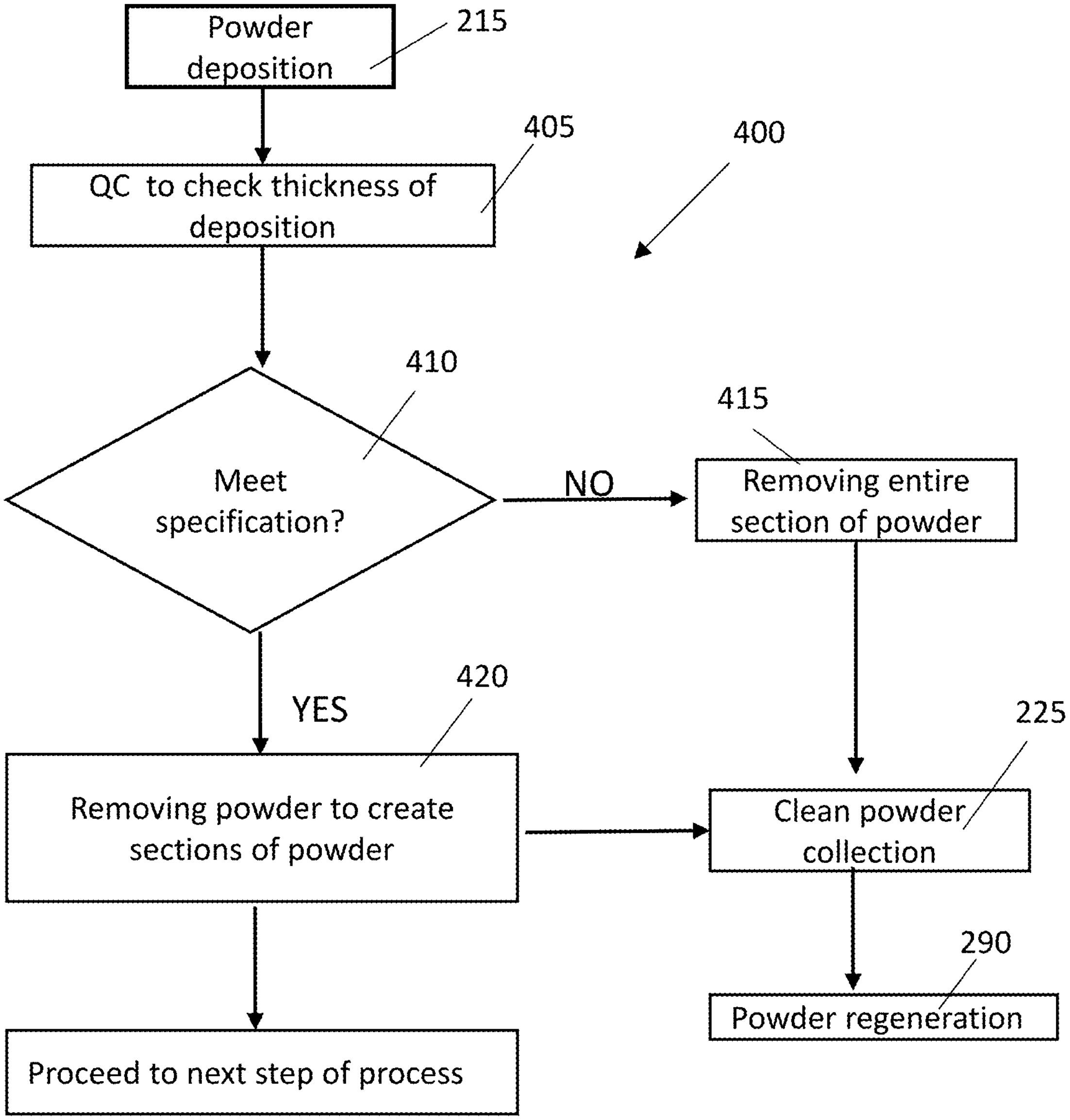
FIG. 4 shows a method of in-situ clean powder collection and regeneration in early stages of the printing system using powder deposition shown in FIG. 2, in accordance with aspects of the present disclosure.
Figure 5:
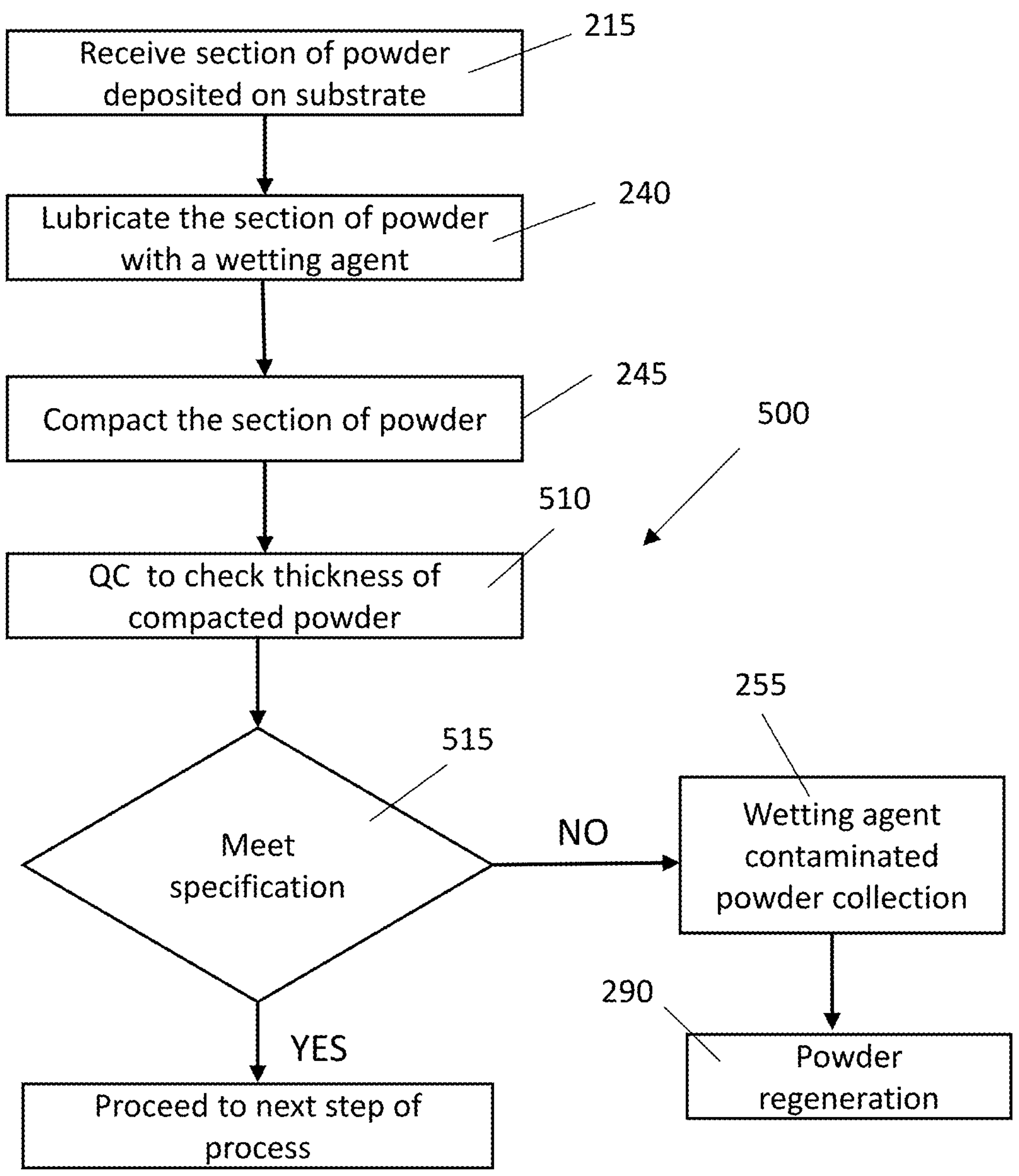
FIG. 5 shows a method of in-situ wetting agent contaminated powder collection and regeneration in middle stages of the printing system using powder deposition shown in FIG. 2, in accordance with aspects of the present disclosure.
Figure 6:
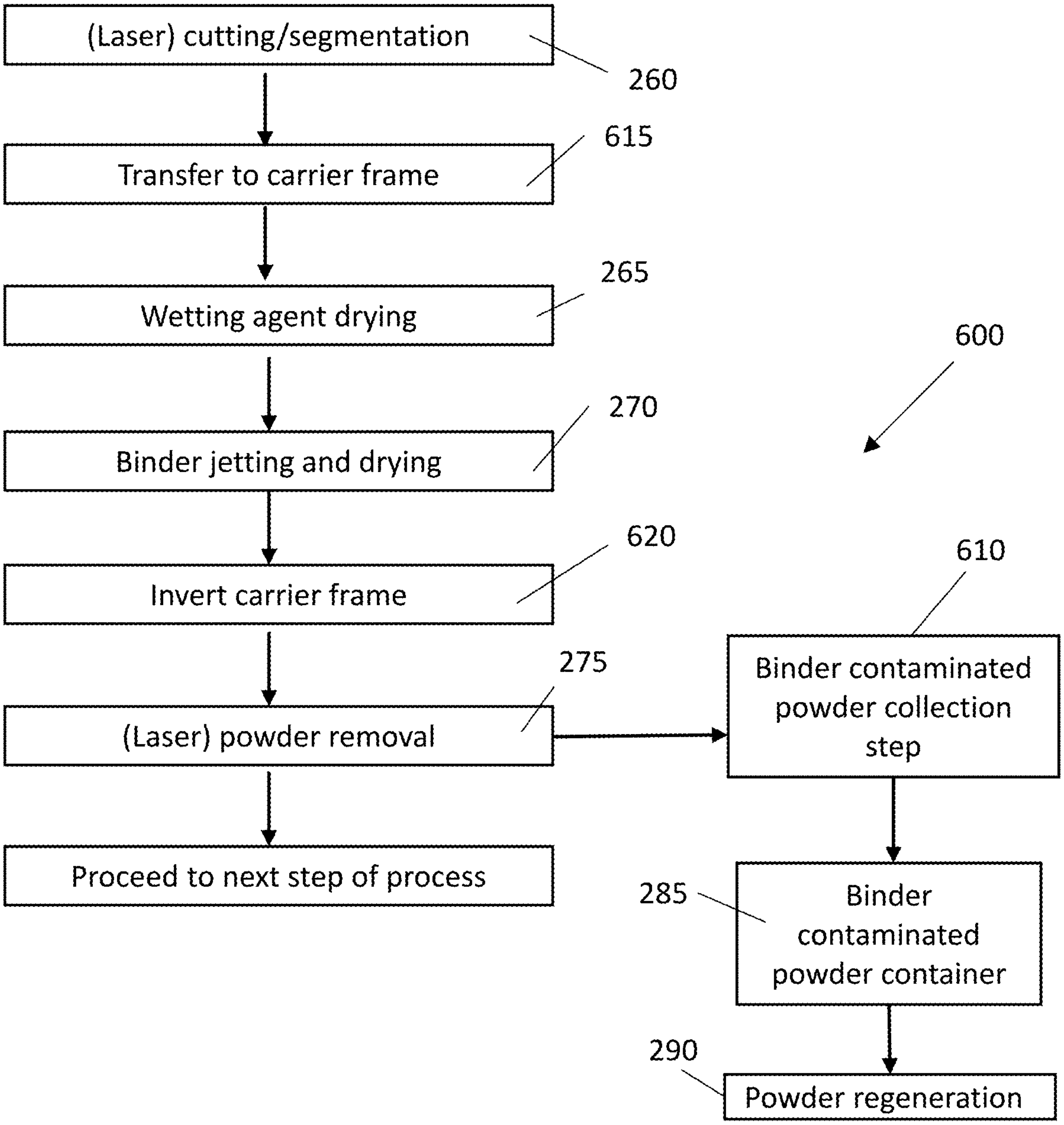
FIG. 6 shows a method of in-situ binder contaminated powder collection and regeneration in final stages of the printing system using powder deposition shown in FIG. 2, in accordance with aspects of the present disclosure.
Figure 9:
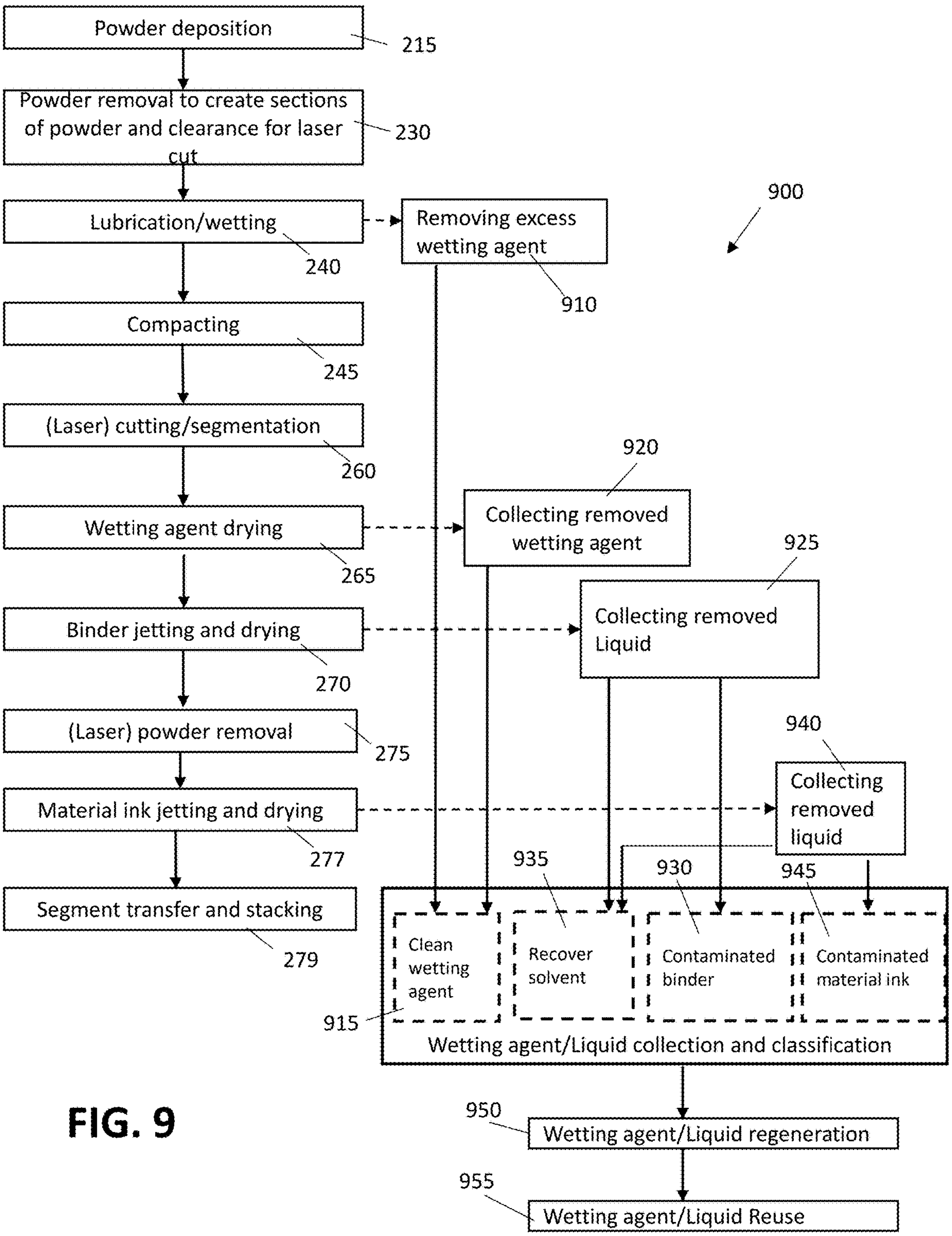
FIG. 9 shows an overall flow chart of a printing process using powder deposited on a substrate, including in-situ wetting agent/liquid collection and regeneration, in accordance with aspects of the present disclosure.

This disclosure also provides an improved AM method and system, for example a 3D printing system, including an in-situ material regeneration system, the material regeneration comprising powder and/or liquid regeneration. The left side of FIG. 2 shows a flowchart of steps for an AM process in conjunction with a powder regeneration arrangement. FIG. 9 shows a flowchart of an AM process in conjunction with a liquid regeneration arrangement. Specifically, FIG. 2 shows an example of a 3D printing system and process 200 using powder deposition on a moving substrate for a series of initial steps of the printing process, followed by cutting of the substrate into segments and mounting the segments, each with a layer of deposited powder thereon, onto individual carrier frames, for the remaining steps of the printing process. More specifically, on the right side of FIG. 2, a flow chart is shown for a powder collection and regeneration process 210 to operate in conjunction with the 3D printing process 205 shown in the left side of FIG. 2. Dashed arrow lines show points in the 3D printing process 205 where portions of powder are collected for regeneration by the regeneration process 210, in accordance with aspects of the present disclosure. It is noted that these portions of powder that are collected at the steps 220, 235, 250, and 280 can be partial portions of the powder or all of the powder (e.g., the entire section of powder) existing at the time of removal (including powder that has been treated with a wetting agent, binder or ink, and which, accordingly, is no longer just powder). In other words, any portion of the powder between 0%-100% remaining at the time of collection can be collected in accordance with the present disclosure. FIGS. 4-6 show more detailed flowcharts of the 3D printing process steps of FIG. 2, and specific points in the 3D printing process where powder (either clean powder or contaminated powder, depending on the stage of processing) is collected for regeneration.

The regeneration method and system 210 shown on the right side of FIG. 2 enables recovery, reconditioning and reuse of used powder, regardless of whether the powder is clean or contaminated. According to this disclosure, and as illustrated in FIG. 2, used clean powder can be first collected after powder deposition 215 following quality control rejection 220. Quality control may include, for example, the height or thickness of the deposited powder, removing any excess powder deposited. In this instance, a first portion of powder is removed, which is clean powder, powder that has not yet been "contaminated" by any lubricant, wetting agent, binder, material ink, solvent, or other substance. The clean powder is stored in a first collection container, a clean powder container 225 of a classification system, as shown in FIG. 2. Further, during powder removal 230 to create sections of powder (segmenting the powder into adjacent layers of powder, separated by clean portions of the substrate to be used for cutting later in the manufacturing process as described below with regard to FIG. 6), the used clean powder, which may also be considered a first portion of powder, is collected (step 235) and is stored in the clean powder container 225. The removal, collection and regeneration of clean powder is further discussed below with regard to FIG. 4.

Still referring to FIG. 2, used powder that has been contaminated with a wetting agent (step 240), referred to as a second portion of the powder can also be removed and collected after a compacting process 245, following quality control rejection 250, and is stored in a second collection container, a wetting agent contaminated powder container 255. This is discussed below with regard to FIG. 5. Later in the printing process 205 after a laser cutting/segmentation step 260, a wetting agent drying step 265, and a binder jetting and drying step 270 (similar to the steps 140, 150 and 155 in FIG. 1*a*), during a (laser) powder removal process 275 (similar to step 165 in FIG. 1*a*), a third portion of powder, which is used unbound powder that has been contaminated by binder is removed and collected in step 280, and is then stored in a third collection container, the binder contaminated powder container 285 for regeneration (step 290) and powder reuse (step 295). The printed layers on the substrate segments go on with material (ink) jetting and drying 277 and segment transfer and stacking 279. The removal, collection and regeneration of binder contaminated powder is further discussed below with regard to FIG. 6.

Following powder collection and classification at the various stages described above with reference to FIG. 2, the collected powder is reconditioned by a powder regeneration system (step 290) and can be fed back for reuse (step 295) in the process steps 205 shown on the left side of FIG. 2. Regeneration of the powder in step 290 may be accomplished, for example, by sieving, drying, burn-out, high temperature treatment, and spray dry processes. Further, the type of regeneration depends on whether the powder is clean, contaminated by a wetting agent, or contaminated by a binder material, as will be discussed in further detail below. One or more of the regeneration steps may be carried out in-situ, or at locations remote from the printing system.

Figure 3:
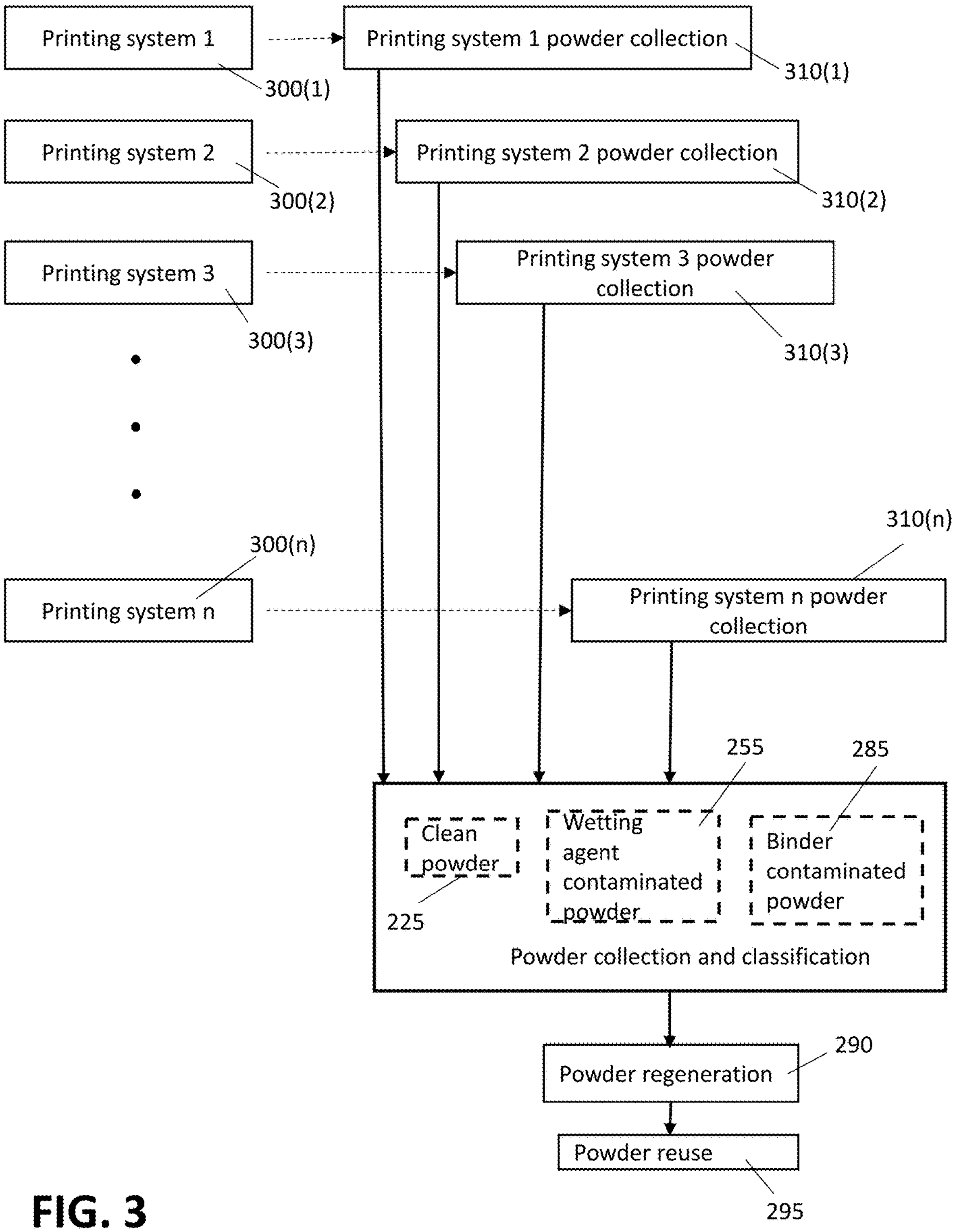
FIG. 3 shows a flow chart of an in-situ powder collection and regeneration method for multiple printing systems using powder deposition, in accordance with aspects of the present disclosure.

In another implementation, as illustrated in FIG. 3, multiple 3D printing systems 300(1), 300(2), 300(3) . . . 300(*n*) can be employed in a 3D printing manufacturing, or other type of AM process. Used powders are collected from each printing system (steps 310(1), 310(2), 310(3) . . . 310(*n*), respectively), stored in centralized classified powder storage containers for clean powder, wetting agent contaminated powder and binder contaminated powder (225, 255 and 285, respectively), reconditioned or regenerated by the centralized powder regeneration system (step 290), and fed back to each printing system for reuse (step 295).

FIG. 4 shows a process 400 for clean powder collection and regeneration at an early point in the 3D printing process 205 shown in FIG. 2. In particular, as illustrated in FIG. 4, clean powder is collected after the powder deposition step 215. The thickness of the deposited powder is then checked in a quality control step (QC) 405. In step 410, if the deposited powder layer fails in this quality control inspection by not being with a predetermined thickness range, the entire powder layer is removed (step 415) and sent to the clean powder container 225. At this point, the process of FIG. 2 would return to depositing a new layer of powder (which can be drawn, if desired, from the clean powder container 225 shown in FIG. 2 and FIG. 4).

As also shown in FIG. 4, clean powder is also collected in step 420 during powder removal by vacuum from a nozzle arrangement, for example, which is used to create clean sections of the substrate free from powder. These clean sections of the substrate can be used to cut the substrate without disrupting the deposits of powder on the substrate, to create segments of the substrate, as will be discussed below. A suitable 3 nozzle arrangement for creating these clean sections is discussed in a related application by the Applicant (U.S. application Ser. No. 18/074,173), entitled "Apparatus and Method to Remove Powder with Flexible Scraper Blade and Adjustable Side Nozzles," filed on Dec. 2, 2022, and which is hereby incorporated by reference.

The clean powder from the clean powder containers of FIG. 2 or 3 may be directly fed back for reuse. In some implementations, the clean powder is blended with virgin powder before sent back for reuse. In other implementations, the clean powder is reconditioned or regenerated by sieving, e.g., ultrasonic sieving if powder agglomeration occurred during printing. In other implementations, if there is significant moisture uptake in the powder during printing, the clean powder is reconditioned first by low temperature (e.g., <300° C.) drying using a convection or vacuum oven, followed by sieving to remove possible large agglomerates formed from drying. In still other implementations, if the powder reacts with components of air, e.g., carbon dioxide, to form a carbonate byproduct, the clean powder is then reconditioned by high temperature (e.g., >300° C.) treatment to purify the powder by decomposing the carbonate byproduct.

In other cases, there may be a significant increase in powder particle size and change in powder particle shape caused by partial sintering from high temperature treatment. In this case, the high temperature treated powder is reconditioned by grinding or milling to reduce the particle size. Milling techniques for particle size reduction may include air classifying mills, pin mills, hammer mills, jet mills, and ball mills. After milling, the high temperature treated powder is further reconditioned to restore particle shapes. For example, the high temperature treated and milled powder is further processed by spray drying to restore the spherical shape. One or more of these reconditioning methods can be applied consecutively or concurrently depending upon the complexity of reconditioning required.

FIG. 5 shows a process 500 for collection and regeneration of wetting agent contaminated powder after the powder has been wetted in a wetting station (e.g., 130 of FIG. 1*a*) in the process step 240 shown in FIG. 2. In this implementation, as illustrated in FIG. 5, powder is collected after a compacting step 245, for example a calendering step, which occurs after the powder has been wetted to improve the calendering operation. Specifically, as discussed above with regard to FIG. 2 and in a related application by the Applicant (U.S. application Ser. No. 18/074,236), entitled "Apparatus and Method to Provide Conditioning to a Deposited Powder," filed on Dec. 2, 2022, and which is hereby incorporated by reference, the powder is wetted to reduce undesirable sticking of the powder to the calendering rollers. The purpose of the calendering step 245 is to compact the powder and to provide a uniformly thick compacted powder. This allows for achieving high packing density (e.g. greater than 30%) which otherwise cannot be achieved with typical AM systems. As shown in FIG. 5, the thickness of the compacted powder layer following passing the powder layer through the calendering rollers is then checked in a second quality control (QC) step 510. If the compacted powder layer fails in this quality control inspection to meet specifications (step 515), for example, if the thickness of the compacted powder layer does not fall within a second predetermined range, the entire powder layer is removed and sent to the wetting agent contaminated powder container 255. If step 515 determines that the thickness is within a predetermined range, then the compacted powder layer is passed on to the next steps of process shown in FIG. 2.

In some implementations, the collected wetting agent contaminated powder is reconditioned or regenerated in step 290 by sieving, e.g. ultrasonic sieving, blended with virgin powder, and then sent back to the process shown in FIG. 2 for reuse. In other implementations, the wetting agent contaminated powder is reconditioned first by low temperature (e.g. <300° C.) drying to remove the wetting agent and then by sieving to remove possible large agglomerates formed from drying. One or more of these reconditioning methods can be applied consecutively or concurrently depending upon the complexity of reconditioning required.

FIG. 6 shows a process 600 for collection and regeneration of the binder contaminated powder collected in a step 610 at a later stage of the 3D printing process 210 shown in FIG. 2. In one implementation, as illustrated in FIG. 6, powder is collected in step 610 during a (laser) powder removal process 275 and stored in the binder contaminated powder container 285. As also shown in FIG. 6, prior to the (laser) powder removal 275, the substrate, on which powder has been deposited, is cut in step 260 at the cleaned areas discussed above regarding FIGS. 2 and 4, to create individual substrate segments, each with a layer of compacted powder thereon. After cutting, the substrate segments are transferred to carrier frames in step 615. The powder layers on the individual substrate segments are then dried to remove any remaining wetting agent in step 265 (that was applied, as discussed above regarding FIG. 5 to reduce sticking of the powder to the rollers in the calendering operation).

Each substrate segment is transferred to its own individual carrier frame in step 615 where it is secured in a locked position for further processing, such as for example, binder application and drying. Appropriate carrier frame systems for this purpose are discussed in the above-noted related application by the Applicant (U.S. application Ser. No. 18/074,298), which is hereby incorporated by reference. It is noted that each individual carrier frame can have a unique identifier (e.g., such as an RFID tag) correlating the carrier frame to the specific individual layer mounted thereon.

As also shown in FIG. 6, each individual carrier frame, with a substrate segment having a layer mounted thereon, can then be inverted in step 620 for purposes of separating the layer from its corresponding substrate segment in order to stack the layer on a stack of other layers to form a multilayer product. This is part of the "Segment transfer and stacking step" shown in FIG. 2. This removal process of the individual layers from the substrate segments mounted on respective carrier frames is also discussed in detail in the above noted related application by the Applicant (U.S. application Ser. No. 18/074,298).

During this inverting process of the carrier frames in step 620, some of the powder in the layers mounted on the respective carrier frames (which has been contaminated by the binder) may fall off. Other binder contaminated powder will be removed in the (laser) powder removal process 275, as discussed in the above-noted related applications by the Applicant (U.S. application Ser. No. 18/074,173 and U.S. Provisional Application No. 63/299,776). As shown in FIGS. 2 and 6, all of this removed binder contaminated powder is collected in the binder contaminated powder collection step 610 and deposited in a binder contaminated powder container 285 for powder regeneration.

In some implementations, the binder contaminated powder is reconditioned in step 290 by sieving, e.g. ultrasonic sieving, blended with virgin powder and then sent back to the process shown in FIG. 2 for reuse. In other implementations, the binder contaminated powder is reconditioned by high temperature (e.g. >300° C.) treatment to purify the powder by decomposing the binder. There may be a significant increase in powder particle size and change in powder particle shape caused by partial sintering from this high temperature treatment. In this case, the high temperature treated powder is reconditioned by grinding or milling to reduce the particle size. Milling techniques for particle size reduction may include air classifying mills, pin mills, hammer mills, jet mills, and ball mills. After milling, the high temperature treated powder is further reconditioned to restore particle shapes. For example, the high temperature treated and milled powder can be further processed by spray drying to restore the spherical shape of the powder particles. One or more of these reconditioning methods can be applied consecutively or concurrently depending upon the complexity of reconditioning required.

Figure 7:
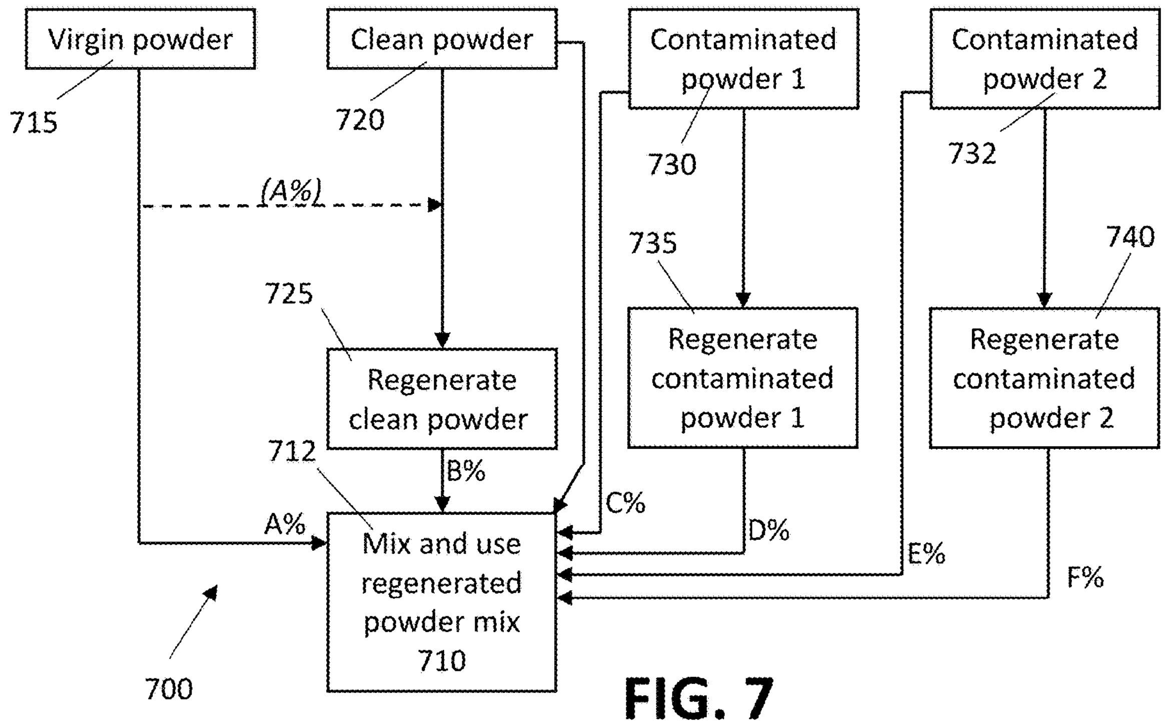
FIG. 7 shows a flow chart of a powder regeneration method for a printing system using powder deposition, in accordance with aspects of the present disclosure.

FIG. 7 shows an example of a process 700 for collecting powder from the various stages of the printing process described in FIG. 2, in order to create powder that can be used in subsequent printing processes. In particular, as illustrated in FIG. 7, a regenerated powder mix 710 is blended in step 712 for subsequent use. The regenerated powder mix 710 comprising a mix of one or more virgin powders 715, collected clean powder 720, regenerated clean powder 725, contaminated powder (1), 730, contaminated powder (2), 732 and regenerated contaminated powders 735 and 740 (for example contaminated powder (1) can be wetting agent contaminated powder and contaminated powder (2) can be binder contaminated powder). Virgin powder 715, that is, powder that has not yet been used or undergone processing in the printing process may be added to the collected clean powder 720 (that has been collected, for example, as described above with reference to FIG. 2) before it undergoes regeneration, or added directly to the regenerated powder mix 710. Although FIG. 7 shows only two types of contaminated powders 730 and 732, it will be apparent that any number of contaminated powders can be utilized, and the form of regeneration carried out will vary based on the process from which the contamination results.

There are numerous ways in which virgin powder 715, clean powder 720, regenerated clean powder 725, contaminated powders 730 and 732 and regenerated contaminated powders 735 and 740 can be combined to form a regenerated powder mix 710. For example, referring to FIG. 7, B % may be 100%, with 0% of virgin, contaminated or regenerated contaminated powder being used. In an alternative, C % and E % may both be 0%, with only virgin and regenerated powders being combined to form the regenerated powder mix. The values of A %, B %, C %, D %, E %, and F % may vary from 0-100%, the percentage representing the percentage of the regenerated powder mix. The percentage may be determined by the application for which the regenerated powder mix is to be used. In some instances, where a certain powder purity is desired, it may be required to use a minimum of 20%-30% virgin powder, 0% contaminated powder, and no more than 5% regenerated contaminate powders, for example.

Figure 8:
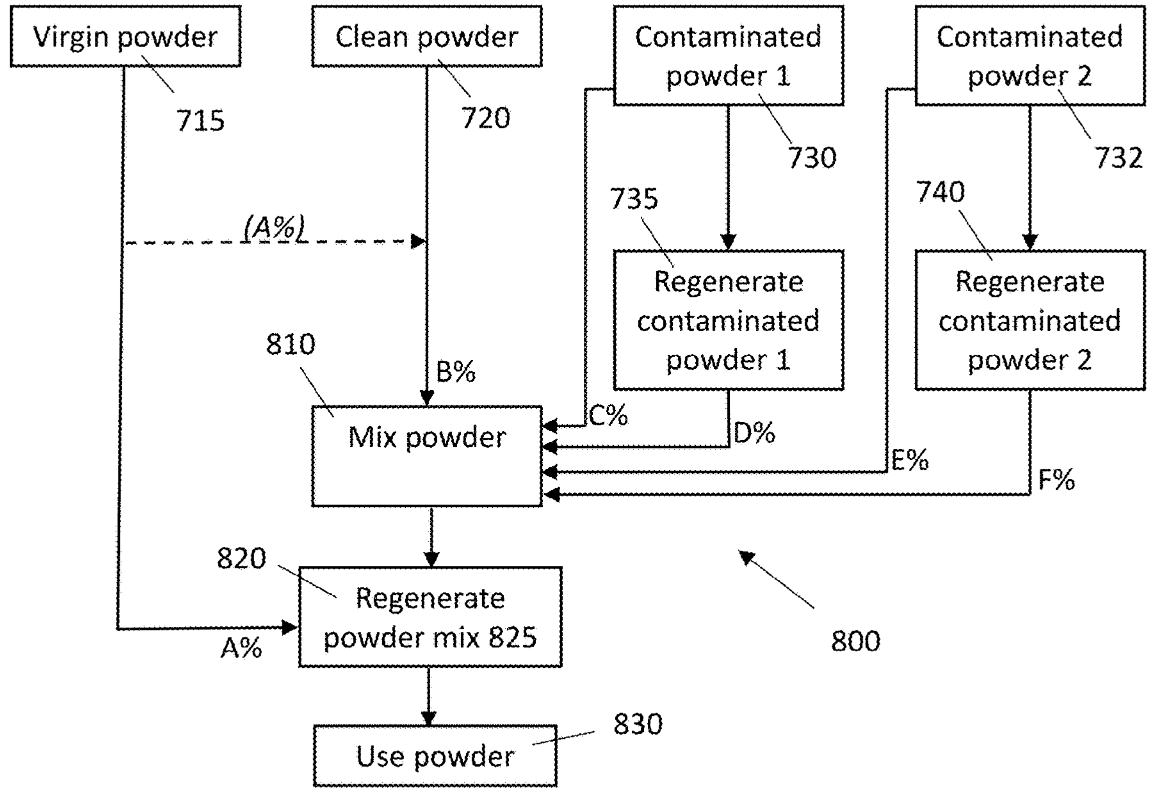
FIG. 8 shows a flow chart of an alternative powder regeneration method for a printing system using powder deposition, in accordance with aspects of the present disclosure.

FIG. 8 shows an example of an alternative process 800 for collecting powder from the various stages of the printing process described in FIGS. 2 and 7, in order to create powder that can be used in subsequent printing processes. In this embodiment, one or more portions varying in percentage from 0-100% of contaminated and regenerated contaminated powders are mixed or blended in step 810 with classified clean powder 720 (which, optionally, can be premixed with virgin powder 715), and subsequently the entire mixture undergoes a regeneration process in step 820 to form a regenerated powder mix 825 that can then be used in subsequent processes (step 830). As also shown in FIG. 8, a portion of virgin powder 715 can also be added to the regenerated powder mix 825 before using the combined powder in subsequent processes.

It will be apparent that though FIGS. 7 and 8 illustrate examples of the numerous ways in which virgin powder, clean powder, regenerated clean powder, contaminated powders and regenerated contaminated powders can be combined to form a regenerated powder mix, this same methodology may equally apply to the formation of regenerated liquid.

In some implementations, as illustrated in FIG. 9, an in-situ recycling system 900 for enabling recovery, reconditioning and/or reuse of the removed liquid may be included. The left side of FIG. 9 shows a flowchart of steps for an AM process using the step discussed above with reference to FIG. 2 (e.g., steps 215-279). On the right side of FIG. 9, a flow chart is shown for a wetting agent/liquid collection and regeneration process to operate in conjunction with the 3D printing process shown in the left side of FIG. 9. Dashed arrow lines show points in the 3D printing process where wetting agent/liquid is collected for regeneration, in accordance with aspects of the present disclosure.

In one implementation, the recovered liquid may be fed directly back and used by the printing system. In some implementations, the recovered liquid is collected and stored in a container before being fed back to reuse without any reconditioning. In some implementations, the recovered liquid is blended with virgin liquid before being fed back to reuse. During certain processes, different liquid mixtures may be created and stored in classified liquid storage containers. For the purpose of proper functioning, the liquid mixtures will need to be purified or regenerated by additional processes. For example, wetting agent being used for lubrication/wetting that becomes contaminated with powder will need to be cleaned by suitable methods, e.g., by filtration to remove the powder contaminant prior to reuse. In a similar fashion, liquid that becomes contaminated with binder or printing inks become contaminated with other materials will need to be purified prior to reuse.

Referring to FIG. 9, clean excess wetting agent can be collected in process 910 during the lubrication/wetting process 240 and stored in a first collection container, a clean wetting agent container 915. Excess vapor and/or condensed liquid may be collected in step 910 from the wetting station with the aid of, for example, hydrophilic material, which provides a mechanism for the condensed water to be transported via one or more ports on a lower portion of the wetting station to the wetting agent storage receptacle 915.

Similarly, excess wetting agent can be collected in step 920 during the drying stage 265 of the printing process and stored in the same clean wetting agent container 915. During binder jetting operation 270, excess liquid binder may be collected in step 925 from the binder jetting station with the aid of, for example, vacuum and/or differential pressure through a semi-permeable membrane and stored in a second collection container, a contaminated binder container 930. The collected liquid from binder jetting may contain various resin binders including monomer, polymer, and curing agent, solvents, and powder contaminant, and may be collected in contaminated binder container 930. Additional solvents can be collected during a drying operation performed on the deposited binder in the same binder jetting station or in a separate drying station, and stored in a fourth collection container, a recover solvent container 935.

Still referring to FIG. 9, during material (ink) jetting operation 277, any excess ink can be collected in process 940. In addition, used ink can be collected following quality control rejection (not shown). Solvents contained in the deposited ink can be collected during drying operation performed on the deposited ink in the same material (ink) jetting station or in a separate drying station, and stored in recover solvent container 935, which may be the same or different from the container used for solvents recovered from binder jetting and drying operations. In some implementation, liquid removal operation may be performed on the deposited ink with the aid of, for example, vacuum and/or differential pressure through a semi-permeable membrane to accelerate the drying process. The excess ink and used ink collected from the material (ink) jetting operation 277 and liquid collected from liquid removal operation 940 may be stored in separate containers, or combined into a mixture, which is stored in a third collection container, a contaminated material ink container 945. The mixture may contain the jetted material, such as metals, ceramics and polymers, binders including monomer, polymer, and curing agent, solvents, and powder contaminant. Following storage of the various liquids in the collection containers 915, 930, 935 and 945, the collected liquids can be regenerated in step 950 and then reused in step 955.

There are numerous methodologies that may be utilized in order to implement the liquid regeneration process 900. For example, the process 900 can involve a filtration to remove solid material, such as a powder from a liquid. In another example, distillation or vaporization may be applied to separate liquids, such as solvents from a solid particulate in a heterogeneous mixture. The distillation may also be applied to separate a liquid, such as a solvent from a solute in a homogeneous mixture. In addition, distillation can be used to separate solvents contained in a liquid after the separation from a solid.

In the above cases, the separation occurs because of differences in the physical properties of the respective components, and in particular, the heat of vaporization. A solid-liquid based purification methodology, such as column chromatography, ion-exchange chromatography, or other similar chromatographic method may be utilized. This may include one or more additional steps such as centrifugation, or selective adsorption using additives such as high surface area carbon, molecular sieves and other suitable adsorbing materials, where one particular component in the mixture has a higher affinity for the additive and is subsequently filtered to separate the component upon absorption to the additive. Alternatively, or additionally, a liquid-liquid based purification methodology may be employed, to separate the components of the mixture based on their solubilities in two liquids, such as two or more solvents.

In another example, the mixtures might be treated with some additional materials, such as a chemical compound or an additive designed to induce crystallization or induce a chemical reaction that enables selective purification of one component in the said mixture. Alternatively, or additionally, the mixture may be treated with other methods, such as thermal decomposition or electrolysis where one component undergoes some chemical transformation that enables the separation.

In some implementations, chemical composition analysis is performed on the recovered liquid to determine if reconditioning or regeneration is required to restore the composition of the liquid. In some implementations, the recovered liquid is regenerated by replenishing the components that are consumed in the printing process. When multiple printing stations or systems are employed, the recovered liquid from each printing station or system is collected, mixed and stored in a container, and the mixed liquid in the container is fed back for reuse by one or more of the multiple printing stations.

It is noted that although the above description has primarily been presented in terms of removing and regenerating powder or liquid on a substrate with a deposited layer in the environment of additive manufacturing, such as 3D printing, the method and system of this disclosure is not limited to only such methods and systems, and could be used in any situation where it is desired to remove and regenerate powder and/or liquid from a substrate with deposited layers mounted thereon.

It is also noted that, although specific examples of processing steps for a 3D printing operation have been illustrated and discussed, the order of the processing steps could be changed, if desired, and/or additional processing steps could be added prior to final stacking of the layers. For example, the substrate could be segmented and the layers on the substrate could be transferred to the carrier frames earlier in the overall process, if desired. Also, the binder could be applied to the layers on the segments of the substrate before the segments have been mounted on the carrier frames. Also, the layers could be compacted after being mounted on the carrier frames, or, following an initial compacting, as described above, further compacting could be performed once the layers are mounted on the carrier frames.

In the following, further features, characteristics and advantages of the instant application will be described by means of items:

Item 1: A method including depositing powder on a substrate at a powder deposition station, removing first portions of the powder to create clean portions of the substrate between portions of deposited powder, moving the portions of deposited powder remaining on the substrate to a wetting station and wetting the powder with a wetting agent at the wetting station, passing the wetted portions of deposited powder through a compacting station to compact the powder, cutting the substrate at the clean portions to create substrate segments each respectively including one of the portions of the deposited powder, transferring the substrate segments having deposited powder mounted thereon to respective carrier frames, moving the substrate segments to a binder jetting station and depositing a binder to the powder at the binder jetting station, and moving the carrier frames, with the substrate segments having the layers mounted thereon, to a stacking station, to stack the layers individually on one another to form a multilayer product.

Item 2: The method of item 1, further comprising depositing the removed first portions of the powder in a clean powder collection container.

Item 3: The method of item 1 or 2, further comprising inverting the carrier frames to separate the layers from the substrate segments.

Item 4: The method of any of items 1-3, further comprising inverting the carrier frames to influence loose/non-compacted powder away from the substrate.

Item 5: The method of any of items 1-4, further comprising removing the loose/non-compacted powder by a laser powder removal station following inverting the carrier frames.

Item 6: The method of any of items 1-5, wherein the compacting station includes calendering rollers.

Item 7: The method of any of items 1-6, further comprising determining one or more parameters of a thickness of the deposited powder, a level of the deposited powder, a surface profile, or a topography of the deposited powder with a monitoring system coupled to the powder deposition station.

Item 8: The method of any of items 1-7, wherein the monitoring system is a vision system.

Item 9: The method of any of items 1-8, further comprising determining if powder removal between the portions of the deposited powder is sufficient to enable a cutting operation to segment the portions of deposited powder into two adjacent powder sections using a clean strip/powder area determination sensor.

Item 10: The method of any of items 1-9, further comprising sensing a degree of wetting of the deposited powder by the wetting station using a wetting sensor and providing feedback to control operations of the wetting station based on the measured degree of wetting of the deposited powder by the wetting station.

Item 11: The method of any of items 1-10, further comprising determining a location of at least one edge of a powder section as it leaves the compacting station using an edge sensor.

Item 12: The method of any of items 1-11, wherein the edge sensor further includes a profilometer configured to determine a surface profile of the deposited powder by quantifying at least one of roughness, flatness, and/or quality of the surface profile of the deposited powder.

Item 13: The method of any of items 1-12, further comprising checking quality of the powder using a profilometer after cutting the substrate at the clean portions to create substrate segments and prior to transferring the portions of deposited powder to the carrier frames.

Item 14: The method of any of items 1-13, further comprising performing one or more of a printing process or a processing operation on the segments of substrate and drying the deposited powder on the segments of the substrate after the printing process or processing operation using a material jetting and drying station.

Item 15: The method of any of items 1-14, further comprising controlling lubrication/wetting of the deposited powder layer by the wetting station, the binder applying station, and the material jetting station and drying station using wetting/drying sensors.

Item 16: A method for 3D printing, the method including creating at least two discrete sections of powder on a substrate, segmenting the substrate to isolate the at least two discrete sections of powder, compacting powder on a segment of the substrate, removing loose/non-compacted powder from the segment of the substrate, creating a printed/processed layer by performing one or more of a printing process or a processing operation on the segment of substrate, and transferring the printed/processed layers from the segment of substrate to a build platform.

Item 17: The method of item 16, wherein the discrete section of powder is lubricated/wet prior to compacting.

Item 18: The method of item 16 or 17, wherein the segmented substrate is transferred to a carrier frame prior to binder being applied.

Item 19: The method of any of items 16-18, wherein the carrier frame is inverted to influence the loose/non-compacted powder away from the substrate.

Item 20: The method of any of items 16-19, further comprising depositing the removed loose/non-compacted powder in a contaminated powder collection container and regenerating the powder from the contaminated powder collection container for reuse.

Item 21: A 3D printing system, the system including a powder deposition station configured to deposit powder on a continuous substrate, a powder removal station configured to create at least two adjacent discrete sections of powder on the continuous substrate, separated by a powder-free clean strip of the continuous substrate, a cutting station configured to cut the continuous substrate at the clean strip of the continuous substrate to segment the continuous substrate into individual substrate segments to isolate the at least two discrete sections of powder respectively formed on adjacent ones of the individual substrate segments, a transfer station configured to transfer the individual substrate segments respectively onto corresponding individual carrier frames, an inverting station configured to invert the carrier frames so that the two discrete sections of powder are suspended from the respective individual substrate segments that they are deposited on, and a stacking station configured to receive and stack discrete sections of the powder from respective carrier frames.

Item 22: The system of item 21, further comprising a compacting station configured to compact the discrete sections of powder, and a laser powder removal station configured to remove loose/non-compacted powder from the segments of the substrate following transferring of the substrate segments to the carrier frames.

Item 23: The system of item 21 or 22, further comprising depositing powder from the powder removal station in a first collection container, depositing the loose/non-compacted powder from the laser powder removal station in a second collection container, different from the first collection container, and regenerating the powder from each of the first and second collection containers for reuse.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The invention claimed is:

1. A method, comprising:

depositing powder on a substrate, the substrate being configured for segmentation;

removing a portion of the deposited powder from the substrate to create a clean portion of the substrate between adjacent portions of the remaining powder;

determining whether powder removal between the adjacent portions of the remaining powder on the substrate is sufficient based on a minimum area of the clean portion of the substrate between the adjacent portions of the remaining powder;

cutting the substrate to create substrate segments;

transferring the substrate segments having deposited powder mounted thereon to respective carrier frames; and moving the substrate segments to a binder jetting station and depositing a binder to the powder at the binder jetting station.

2. The method of claim 1, further comprising removing discrete sections of powder from the substrate to create additional clean portions on the substrate, wherein the clean portions isolate regions of powder, and wherein the clean portions form clean strips to facilitate segmenting of the substrate along the clean strips.

3. The method of claim 2, further comprising cutting the substrate along the clean strips to segment the substrate into the individual substrate segments that isolate each region of powder on each individual substrate segment.

4. The method of claim 1, further comprising cutting the substrate at the clean portion to create the substrate segments, each substrate segment including one of the remaining portions of the deposited powder.

5. The method of claim 1, wherein removing a portion of the deposited powder from the substrate, further comprises determining whether the portion of the deposited powder contains one or more defects for removal.

6. The method of claim 1, further comprising removing loose powder, and depositing the loose powder and the removed portions of the deposited powder in a clean powder collection container.

7. The method of claim 1, wherein depositing powder on the substrate, further comprises determining one or more parameters of a thickness of the dispensed powder level, a surface profile, or a topography of the deposited powder at one or more locations on the substrate.

8. The method of claim 7, wherein the deposited powder on the substrate forms a powder layer of a predetermined height and thickness, wherein excess clean powder is removed from the powder layer based on the height and thickness of the powder layer for reuse, and wherein contaminated powder from the powder layer, having been further wetted or jetted with binder, is removed and reconditioned for reuse.

9. The method of claim 1, further comprising wetting the powder with a wetting agent and passing the wetted portions of deposited powder through a compacting station to compact the powder.

10. The method of claim 1, wherein determining whether powder removal between adjacent portions of the remaining powder on the substrate is sufficient, further comprises determining a location of one or more edges of the adjacent powder portions to enable a subsequent cutting operation to segment the each of the adjacent powder portions into individual substrate segments.

* * * * *